United States Patent [19]

Carder

[11] 3,940,360

[45] Feb. 24, 1976

[54] SILANE CONTAINING COATING COMPOSITIONS

[75] Inventor: Charles Hobert Carder, Charleston, W. Va.

[73] Assignee: Union Carbide Corporation, New York, N.Y.

[22] Filed: Feb. 12, 1974

[21] Appl. No.: 441,904

[52] U.S. Cl..... 260/29.1 SB; 260/42.15; 260/42.54; 260/448.8 R
[51] Int. Cl.² ...................... C08K 5/54; C08K 9/06
[58] Field of Search ... 260/29.1 SB, 448.8 R, 42.15, 260/42.54

[56] References Cited
UNITED STATES PATENTS
2,467,858 4/1949 Sage .................................. 260/738

OTHER PUBLICATIONS
Union Carbide Corp. — Silanes, Technical Bulletin SF-1160B, (Aug. 1966), pp. 14–15.

Union Carbide Corp. — Silicones, Technical Bulletin P1B15-12, (Jan. 1965), p. 1.

Union Carbide Corp. — Silicones, Technical Bulletin CSB15-7A, (Oct. 1964).

Freeman — Silicones (Iliffe Books Ltd.), (London), (1962), pp. 35–36.

Primary Examiner—Donald E. Czaja
Assistant Examiner—H. H. Fletcher
Attorney, Agent, or Firm—Francis M. Fazio

[57] ABSTRACT

The use of certain silane compounds reduces the viscosity and thixotropy of acrylyl coatings compositions thus permitting their more efficient use in conventional coating techniques.

9 Claims, No Drawings

SILANE CONTAINING COATING COMPOSITIONS

BACKGROUND OF THE INVENTION

With the advent of solvent-free coating compositions difficulties have been encountered in applying the viscous, thixotropic coatings by conventional industrial techniques. These problems have been further aggravated when any significant amount of flatting agent or pigment is present as these often serve to render the compositions more viscous and thixotropic. The ability to produce coating compositions that can be readily and uniformly applied to a surface so that they can be rapidly cured to a dry film is of important commercial significance. This is particularly true in the field of radiation curable compositions.

SUMMARY OF THE INVENTION

The instant invention relates to the use of certain silane compounds to improve the fluidity or flowability of polymerizable acrylyl coating compositions. In this invention a small amount of the silane compound is added to the coating composition and this has an unexplainable effect that causes an increase in flowability and, as a result, a more uniform and attractive cured film is produced.

DESCRIPTION OF THE INVENTION

The silane compounds that have been found suitable in reducing the viscosity and thixotropy of the polymerizable acrylyl coating compositions can be represented by the general formula:

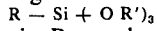

wherein R can be vinyl; alkyl of from 1 to about 8 carbon atoms, such as methyl, ethyl, propyl, butyl, isobutyl, hexyl, 2-ethylhexyl, etc; phenyl;

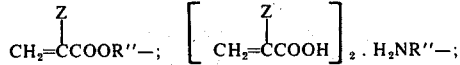

or HOOCCH=CHCONHR''—; Z is hydrogen or methyl; R'' is divalent alkylene of from 1 to about 6 carbon atoms, such as methylene, ethylene, propylene, isopropylene, hexylene, etc.; and R' can be alkoxy of from 1 to about 6 carbon atoms; alkoxyalkyloxy having a total of up to about 8 carbon atoms; or lower acyl having up to five carbon atoms.

Illustrative of suitable silanes one can mention ethyltriethoxysilane, ethyltripropoxysilane, vinyltributoxysilane, phenyltriethoxysilane, methyltriethoxysilanae methyl trimethoxysilane, vinyltrimethoxysilane, vinyltriacetoxysilane, vinyl(trimethoxyethoxy)silane, gamma-methacryloxypropyltrimethoxysilane, and the like. It is not essential that the R' groups be identical; however, it has been found that these are more readily manufactured.

The silane compounds are used in the coating compositions at concentrations of from about 0.1 to about 10 weight percent; perferably from about 0.4 to about 2 weight percent. They are added by any conventional blending or mixing technique. They are preferably added during the pigment or flatting agent dispersion step.

The polymerizable acrylyl coating compositions to which the silane compounds are added are any of the coating compositions containing a polymerizable acrylyl compound. The term polymerizable acrylyl compound means any monomer, oligomer, or polymer containing a methacrylyl, acrylyl, methacrylamide, acrylamide, methacrylonitrile, or acrylonitrile moiety in the molecule. These compounds are well known to those skilled in the art and a large number of them are commercially available. The polymerizable acrylyl coating compositions contain a major amount of the polymerizable acrylyl compound as the film forming component and can be used individually or in combination with one another.

Illustrative of suitable polymerizable acrylyl compounds one can mention acrylic acid, acrylamide, methyl acrylate, ethyl acrylate, hexyl acrylate, 2-ethylhexyl acrylate, butoxyethoxyethyl acrylate, neopentyl glycol diacrylate, bicyclo[2.2.1]-hept-2yl acrylate, dicyclopentenyl acrylate, pentaerythritol mono- or di- or tri- or tetra-acrylate or mixtures thereof, isodecyl acrylate, trimethylolpropane mono- or di- or triacrylate or mixtures thereof, 2-phenoxyethyl acrylate, glycidyl acrylate, 2-ethoxyethyl acrylate, 2-methoxyethyl acrylate, 2-(N,N-diethylamino)ethyl acrylate, omega-methoxyethyl(hendecaoxyethylene) acrylate, omega-tridecoxyethyl(hendecaoxyethylene) acrylate, trimethoxyallyloxymethyl acrylate, bicyclo[2.2.1]-hept-2-en-5-ylmethyl acrylate, ethylene glycol diacrylate, bicyclo[2.2.1]hept-2-en-5,6-diyl diacrylate, vinyl acrylate, 2-hydroxypropyl acrylate, 2-hydroxyethyl acrylate, acrylated, epoxidized soybean oil, acrylated epoxidized linseed oil, (methyl carbamyl)ethyl acrylate, the reaction product of an aromatic or aliphatic polyisocyanate (such as tolylene diisocyanate) with a hydroxyalkyl acrylate (such as 2-hydroxyethyl acrylate or 2-hydroxypropyl acrylate), acrylonitrile, methacrylonitrile, as well as the corresponding methacrylates, acrylamides, and methacrylamides of the above specifically named acrylate compounds. The acrylyl compounds are well-known and the above discussion is only illustrative; any photocurable compound containing the acrylyl group is suitable for use.

When the acrylyl coating composition is to be cured by light radiation any of the known photosensitizers can be present. The amount of photosensitizer can be varied from 0.01 to about 20 weight percent, preferably from about 0.1 to about 10 weight percent, and more preferably from about 0.5 to about 5 weight percent. Illustrative of suitable photosensitizers one can mention acetophenone, propiophenone, benzophenone, xanthone, thioxanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, 1,3-diphenylacetone, p-diacetylbenzene, 3- or 4-methoxybenzophenone, 3-or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyanthone, 3-iodo-7-methoxyxanthone, 2-chlorothioxanthone, benzoin, benzoin methyl ether, benzoin butyl ether, benzoin isobutyl ether, and mixtures thereof.

The coating compositions can also include pigments, fillers, other wetting agents, flatting agents, crosslinkers and other additives typically present in coating compositions. These are all well known to those skilled in the art and do not require further elaboration herein. Also known, are the concentrations at which they are used.

The presence of the silane compound in the polymerizable acrylyl coating composition results in an increase in flowability and fluidity. Consequently, the polymerizable acrylyl coating composition can be applied to the substrate to be coated in a more economical and efficient manner. It was also observed that a smoother and more uniform film could be applied as evidenced by the lack of rod marks when using a wire wound rod when the silane compounds have been added to some of the more highly viscous coating compositions. In addition, it was observed that one could incorporate larger quantities of fillers, pigments, or flatting agents in the formulation with the use of these silane compounds. One can also include a conventional solvent if desired. The solvents used in coating compositions are well known and do not require further discussion to enable one skilled in the art to known what they are.

The improved coating compositions of this invention can be applied and cured by any of the conventional known methods. Application can be by roll coating, curtain coating, airless spray, dipping, or by any other procedure. The cure can be by ionizing a non-ionizing radiation means or by heating in a suitable oven. All of these procedures are accepted procedures and it is known that curing by heat is generally expedited by the presence of a free radical initiator in the composition. Any source of ultraviolet radiation can be used.

The film coating produced generally has a smooth, uniform appearance. Its thickness is generally less variable across the planar surface as a result of the improved flowability imparted to the fluid coating composition by the silane compound.

The following examples serve to further illustrate the invention:

EXAMPLE 1

A formulation was prepared containing:

| | | |
|---|---|---|
| HEA/TMDI/HPA adduct* | 133.32 | grams |
| Neopentyl glycol diacrylate | 80 | |
| 2-Ethylhexyl acrylate | 40 | |
| Hydroxyethyl acrylate | 146.68 | |
| Trigonal-14 | 8.0 | |
| Syloid 74 | 88.0 | |

*The adduct of equimolar parts of 2-hydroxyethyl acrylate, tetramethylhexamethylene diisocyanate and 2-hydroxypropyl acrylate diluted to 90% concentration with an excess of 2-hydroxypropyl acrylate.

Trigonal-14 is the butyl ether of benzoin.
Syloid 74 is finely divided silica.
The Brookfield viscosities at different spindle speeds, at 23°C with a No. 3 spindle, was determined:

| Speed | cps |
|---|---|
| 0.5 | 33,400 |
| 1.0 | 21,600 |
| 2.5 | 9,200 |
| 5 | 5,000 |
| 10 | 2,650 |
| 20 | 1,435 |
| 50 | 700 |
| 100 | 435 |

The formulation was too viscous and thixotropic to obtain a Gardner-Holdt viscosity measurement.

To separate portions of the formulation, the silane compounds were added to reduce the viscosity and thixotropy so as to facilitate application of the coating to the surface. The silanes were added at 0.5 and 1 weight percent levels. In all instances an increase in fluidity of the coating composition was obtained though in two instances, II and III, the increase was slight. The results are tabulated below:

Gardner-Holdt Viscosity

| | 0.5% | | 1% | |
|---|---|---|---|---|
| | Same Day | Two Days Later | Same Day | Two Days Later |
| I | C–D | C–D | A–B | A–B |
| II | * | * | * | * |
| III | * | * | * | * |
| IV | E–F | E–F | D | D |
| V | D–E | B | B | A–A1 |
| None | * | * | * | * |

\* = too thixotropic to measure
I vinyltri(methoxyethoxy)silane
II methyltriethoxysilane
III reaction product of one mole of gamma-aminopropyl triethoxysilane with two moles of acrylic acid
IV gamma-methacryloxypropyltrimethoxysilane
V HOOCCH=CHCONH(CH$_2$)$_3$ Si(OCH$_2$CH$_3$)$_3$ The results show that silanes I, IV and V cause a marked decrease in viscosity and thixotropy when compared to the control containing no silane. Silanes II and III showed a slight decrease in viscosity and thixotropy and the formulations exhibited better fluidity than did the control composition.

The silane-containing compositions were applied to Bonderite No. 37 steel panels using a No. 20 wire wound rod and cured under a 15 kilowatt argon swirl-flow plasma arc radiation source under an inert gas atmosphere. The panel was 6 inches from the arc and it was exposed to the continuous light radiation for about 0.6 second (traveling at a rate of 100 feet per minute under the arc). In all instances an attractive dry film was obtained. The properties of the films are tabulated below:

| Silane | Sward Hardness | Pencil Hardness | 60° Gloss | Acetone Resistance | Film Thickness |
|---|---|---|---|---|---|
| At 0.5% Level | | | | | |
| I | 18 | 3B | 36 | >300 | .7 |
| II | 18 | B | 44 | 207 | 1.0 |
| III | 16 | 3B | 42 | 274 | 1.2 |
| IV | 18 | 3B | 42 | >300 | 0.8 |
| V | 18 | 2B | 41 | >300 | 1.1 |
| None (Control) | 16 | 5B | 39 | >300 | 0.9 |
| At 1.0% Level | | | | | |
| I | 18 | 3B | 37 | >300 | 0.9 |
| II | 18 | 6B | 43 | >300 | 1.0 |
| III | 16 | 5B | 41 | >300 | 0.8 |
| IV | 14 | 5B | 55 | >300 | 0.8 |
| V | 16 | 6B | 42 | >300 | 0.9 |
| None (Control) | 16 | 6B | 36 | >300 | 0.8 |

| | Silane | Sward Hardness | Pencil Hardness | 60° Gloss | Acetone Resistance | Film Thickness |
|---|---|---|---|---|---|---|

Sward Hardness determined according to the instructions in the Paint Testing Manual, Gardner Laboratory, p. 138.

Pencil Hardness determined using sharpened pencil of standard hardness ratings.

60° Gloss determined according to ASTM-D-523-67

Acetone Resistance is determined by placing a wad of acetone-saturated cotton on the film surface, maintaining saturation and measuring the time in seconds required for the film to lift.

The coating compositions containing silanes I to V were easier to apply than was the control; they did not show rod marks and were more uniform. The cured films of these silane-containing compositions were smoother and thus had a more attractive appearance.

EXAMPLE 2

Formulations were prepared as described in Example 1 using 0.5 weight percent of Silanes I and IV. These were applied to birch plywood; the first coat was cured and sanded, the second was cured only. Curing was as in Example 1 but at different cure rates under the swirl-flow plasma arc. The same advantages were observed during application and in the cured film as seen in Example 1. The results are tabulated below at different exposures:

| | Silane | Sward Hardness | 60° Gloss | Taber Wear Factor[1] | Resistance To Stains[2] |
|---|---|---|---|---|---|
| 60 fpm | A-172 | 22 | 34 | 1.6 | 39/40 |
| | A-174 | 22 | 38 | 1.6 | 39/40 |
| | None | 20 | 34 | 1.7 | 39/40 |
| 120 fpm | A-172 | 14 | 33 | 1.6 | 39/40 |
| | A-174 | 12 | 35 | 1.6 | 39/40 |
| | None | 10 | 32 | 1.5 | 39/40 |
| 180 fpm | A-172 | 8 | 15 | 2.0 | 39/40 |
| | A-174 | 8 | 11 | 4.5 | 38/40 |
| | None | 10 | 17 | — | 38/40 |

[1]Taber Abraser, CS-17 wheels, 1000 gram weights, 200 cycles, mg loss per 100 cycles.
[2]Four-hour tests with mercurochrome, aqueous ammonia, bleach and black ink. 40/40 represents no staining whatsoever, 0/40 represents complete failure by staining or softening.

EXAMPLE 3

A coating composition was produced by pebble mill grinding the following:

| | Grams |
|---|---|
| Urethane acrylate* (80% in 2-EHA) | 26.75 |
| Neopentyl glycol diacrylate | 17.50 |
| 2-Hydroxyethyl acrylate | 21.00 |
| 2-Ethylhexyl acrylate (2-EHA) | 5.25 |
| 2-Chlorothioxanthone | 1.19 |
| Titanium Dioxide (R-900) | 49.00 |

*Reaction product of one mole of polycaprolactone diol having an average molecular weight of about 530, two moles of isophorone diisocyanate and two moles of 2-hydroxyethyl acrylate as an 80 percent solution in 2-ethylhexyl acrylate.

To the composition there were added 2.1 grams of methyl diethanolamine and the Brookfield viscosities measured using a No. 4 spindle at 23°C., these were:

| Speed | cps. |
|---|---|
| 1 | 19,000 |
| 5 | 4,800 |
| 20 | 1,650 |
| 100 | 570 |

To separate portions of the above composition there was added one weight percent of the silane compounds and these formulations were applied to the steel panels using a No. 10 wire wound rod. They were then cured by moving at a line-speed of 50 feet per minute through a nitrogen blanketed chamber containing four 36 inches long, 25 watts, low pressure mercury tubes, emanating ultraviolet light radiation substantially all of which had a wavelength of 2,537 Angstrom untis. The tubes were arranged in parallel with the carrier belt. The panels were subsequently exposed to radiation from three 2.2 kilowatt medium pressure mercury lamps in air for about 1.5 seconds. The cured film properties are tabulated below:

| Silane | Sward Hardness | Acetone Resistance (Sec.) | Impact Resistance Face | Reverse |
|---|---|---|---|---|
| I | 4 | 16 | 90 | 50 |
| II | 4 | 22 | 150 | 50 |
| III | 4 | 24 | 150 | 50 |
| IV | 4 | 45 | 145 | 50 |
| None (Control) | 4 | 19 | 145 | 45 |

It was observed that the cured films that contained the silanes, particularly those containing silanes III and IV, were smoother and more unform than was the film obtained with no silane present in the coating composition. Further, the compositions containing the silanes could be applied with greater ease and more uniformity than the control.

EXAMPLE 4

This example shows that not all silicon-containing compounds can be used. Thus, a composition containing 5 parts of 2-hydroxyethyl acrylate, 5 parts of isodecyl acrylate, 5 parts of neopentyl glycol diacrylate and 15 parts of (carbamylethyl) acrylate was produced and two separate portions were treated with different silanes.

The first portion contained 0.6 part of silane IV, 100 parts of the above photocurable composition and 15 parts of finely divided silica. This formulation showed very good dispersion and flowability after standing for 24 hours.

The second portion was the same, but it contained 0.6 part of a dimethylsiloxane silicone oil having a viscosity at 25°C of 5-15 centistokes rather than Silane II. This formulation showed very poor dispersion and flowability on preparation and after standing for 24 hours and was about eqivalent to the same formulation without any silicon compound present.

What is claimed is:

1. A polymerizable acrylyl coating composition containing a polymerizable monomer, oligomer, or polymer having a methacrylyl, acrylyl, methacrylamide, acrylamide, methacrylonitrile, or acrylonitrile moiety in the molecule, and containing from 0.1 to 10 weight percent of said composition of a silane compound of the formula:

R—Si—(OR')3 wherein
R is vinyl,
  alkyl of from 1 to 8 carbon atoms,
  phenyl,
  CH$_2$=CZCOOR''—,
  [CH$_2$=CZCOOH]$_2$ . H$_2$NR''=—or
  HOOCCH=CHCONHR'';

Z is hydrogen or methyl;
R'' is divalent alkylene of from 1 to 6 carbon atoms;
R' is alkoxy of from 1 to 8 carbon atoms, alkoxyalkyloxy having a total of 8 carbon atoms or lower acyl having up to 5 carbon atoms.

2. A polymerizable acrylyl coating composition as claimed in claim 1 wherein the silane compound is present at a concentration of from 0.4 to 2 weight percent of said composition.

3. A polymerizable acrylyl coating composition as claimed in claim 1 wherein the silane compound is vinyltri(methoxyethoxy)silane.

4. A polymerizable acrylyl coating composition as claimed in claim 1 wherein the silane compound is methyltriethoxysilane.

5. A polymerizable acrylyl coating composition as claimed in claim 1 wherein the silane compound is the reaction product of one mole of gamma-aminopropyltriethoxysilane with two moles of acrylic acid.

6. A polymerizable acrylyl coating composition as claimed in claim 1 wherein the silane compound is gamma-methacryloxypropyltrimethoxysilane.

7. A polymerizable acrylyl coating composition as claimed in claim 1 wherein the silane compound is HOOCCH=CHCONH(CH$_2$)$_3$ Si (OCH$_2$CH$_3$)$_3$.

8. A polymerizable acrylyl coating composition as claimed in claim 1 wherein a flatting agent is present.

9. A polymerizable acrylyl coating composition as claimed in claim 1 wherein a pigment is present.

* * * * *